N. J. TITUS.
Harvester.
No. 206,368.  Patented July 23, 1878.
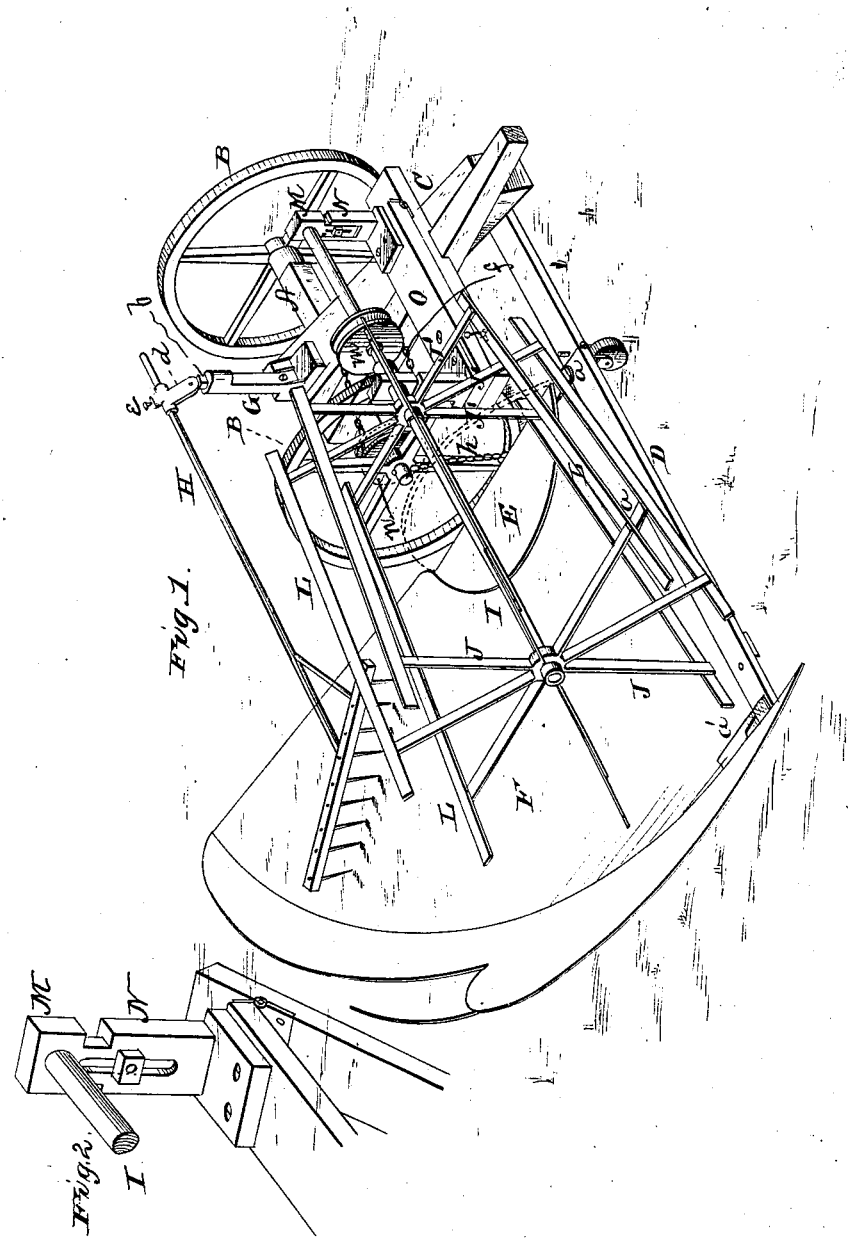
WITNESSES
Franck L. Durand
H. Aubrey Toulmin
INVENTORS
Nathaniel J. Titus
By Alexander Mason
Attorneys

UNITED STATES PATENT OFFICE.

NATHANIEL J. TITUS, OF PORTLAND, NEW YORK, ASSIGNOR OF ONE-HALF HIS RIGHT TO L. A. BIGELOW AND W. L. SMITH, OF SAME PLACE.

IMPROVEMENT IN HARVESTERS.

Specification forming part of Letters Patent No. 206,368, dated July 23, 1878; application filed April 8, 1878.

*To all whom it may concern:*

Be it known that I, NATHANIEL J. TITUS, of Portland, in the county of Chautauqua, and in the State of New York, have invented certain new and useful Improvements in Attachment for Reaping-Machines; and do hereby declare that the following is a full, clear, and exact description thereof, reference being had to the accompanying drawings, and to the letters of reference marked thereon, making a part of this specification.

The nature of my invention consists in the construction and arrangement of certain attachments for reapers, as will be hereinafter more fully set forth.

In order to enable others skilled in the art to which my invention appertains to make and use the same, I will now proceed to describe its construction and operation, referring to the annexed drawing, in which—

Figure 1 is a perspective view of a reaper embodying my invention. Fig. 2 is a detailed view of a part thereof.

A represents the axle, B B the wheels, C the frame, and D the cutter-bar, of a mower. F represents the table, which is self-supporting—*i. e.*, attached to the cutter-bar D, and has no support on the outside; but it is supported on the inside by a chain, *h*, from the axle to the table, and is raised and lowered by means of the lever commonly employed for raising the cutter-bar, said cutter-bar being hinged and operated in the usual manner. The table F is attached to the cutter-bar D by means of three metallic straps, *a*, *a*, and *a'*. At the inner edge of the table F is hinged a semicircular board, E, next to the drive-wheel, which board, when raised, prevents the grain from clogging and scattering.

On the frame C is a stationary standard, G, in the upper end of which is swiveled an upright pin, *b*, and on the upper end of said pin is hinged a joint, *d*, through the upper end of which is passed the rake-shaft H, adjusted and held therein by a set-screw, *e*. By these swivel and knuckle joints the rake can be moved easily in any required manner. The board E on the table F may be laid down and the table raised when required to take out and put in the cutting-knife, and also when going from one place to another, or through bars, gates, &c.

I is the reel-shaft, provided with two eight-armed spiders, J J'. The arms of the outer spider, J, are longer than those on the inner, and the slats L connecting said spider-arms form a conical reel, which I have found by experiment will lay the grain better than a straight reel. By constructing the reel in conical form the tendency will be to throw the grain at an angle on the platform and bring the heads all in one direction, so as to be properly carried off from the platform without any liability of mixing heads and butts. The shaft I is placed or has its bearings in slides M M, which are adjustable in standards N N, the slides being slotted and fastened by bolts, as shown in Fig. 2, whereby the reel can be raised or lowered, as required, according to the height of the grain. The standards N N are secured on a bar or board, O, which is hinged at its outer end to the frame, allowing the reel to be raised on end if necessary. The reel is driven by a chain, *f*, from the pulley *m* on the reel-shaft to a pulley, *n*, on the ratchet-wheel of the mower.

Having thus fully described my invention, what I claim as new, and desire to secure by Letters Patent, is—

1. In combination with the main frame of a harvester, the platform F, secured to the hinged cutter-bar, the board E, hinged to the platform, and the reel J L, mounted upon the hinged board O, all substantially as and for the purposes herein set forth.

2. The combination of the knuckle and swivel joint *b d*, the rake-handle H, adjustable therein, standard G, and set-screw *e*, all substantially as and for the purposes herein set forth.

3. The combination of the reel-shaft I, slides M M, standards N N, and hinged board O, as and for the purposes herein set forth.

In testimony that I claim the foregoing I have hereunto set my hand this 15th day of October, 1877.

NATHANIEL J. TITUS.

Witnesses:
J. M. MASON,
J. LA DUE.